(12) United States Patent
Patodia et al.

(10) Patent No.: US 12,131,201 B2
(45) Date of Patent: Oct. 29, 2024

(54) AUTOMATICALLY MANAGED COMMON ASSET VALIDATION FRAMEWORK FOR PLATFORM-BASED MICROSERVICES

(71) Applicant: PAYPAL, INC., San Jose, CA (US)

(72) Inventors: Prabin Patodia, Bangalore (IN); Shivam Jari, Bengaluru (IN); Rajendra Bhat, Bangalore Urban (IN)

(73) Assignee: PAYPAL, INC., San Jose, CA (US)

( * ) Notice: Subject to any disclaimer, the term of this patent is extended or adjusted under 35 U.S.C. 154(b) by 134 days.

(21) Appl. No.: 18/068,680

(22) Filed: Dec. 20, 2022

(65) Prior Publication Data

US 2024/0202048 A1 Jun. 20, 2024

(51) Int. Cl.
*G06F 9/54* (2006.01)
*G06F 8/65* (2018.01)

(52) U.S. Cl.
CPC . *G06F 9/54* (2013.01); *G06F 8/65* (2013.01)

(58) Field of Classification Search
None
See application file for complete search history.

(56) References Cited

U.S. PATENT DOCUMENTS

| 9,778,964 | B1 * | 10/2017 | Mowatt | G06F 9/44505 |
| 11,785,280 | B1 * | 10/2023 | Dakss | H04N 21/478 |
| | | | | 725/37 |
| 2008/0127081 | A1 * | 5/2008 | Schumann | G06F 8/10 |
| | | | | 717/120 |
| 2010/0223211 | A1 * | 9/2010 | Johnson | G06Q 10/0637 |
| | | | | 706/11 |
| 2010/0293007 | A1 * | 11/2010 | Schoenberg | G16H 40/63 |
| | | | | 705/2 |
| 2011/0289440 | A1 * | 11/2011 | Carter | H04L 41/12 |
| | | | | 709/224 |
| 2013/0073504 | A1 * | 3/2013 | Mohindra | G06N 5/02 |
| | | | | 706/46 |

(Continued)

FOREIGN PATENT DOCUMENTS

CN 113806432 A * 12/2021

OTHER PUBLICATIONS

Bon, "Analytics in a Decision Service Context Exploring analytical values for enhancing automated decision performance", 2017, Lund University (Year: 2017).*

*Primary Examiner* — Hossain M Morshed
(74) *Attorney, Agent, or Firm* — Haynes and Boone, LLP (57) ABSTRACT

There are provided systems and methods for an automatically managed common asset validation framework for platform-based microservices. A service provider, such as an electronic transaction processor for digital transactions, may utilize different decision services that implement rules and/or artificial intelligence models for decision-making from input data including data in a production computing environment. A decision service may normally be used for data processing and decision-making through an execution flow configuration and/or graph identifying a flow of task executions and other computing operations. In this regard, the decision services may share common data assets, such as data tables, shared code for execution of operations and the like. The service provider may utilize an intelligent service to automatically manage and validate these assets between services so that execution errors do not occur when there are changes to these common assets.

20 Claims, 5 Drawing Sheets

(56) References Cited

U.S. PATENT DOCUMENTS

| | | | |
|---|---|---|---|
| 2014/0250306 A1* | 9/2014 | Ziegler | H04L 63/20 |
| | | | 726/17 |
| 2016/0127564 A1* | 5/2016 | Sharma | H04L 41/5058 |
| | | | 455/406 |
| 2017/0353529 A1* | 12/2017 | Harpur | H04L 67/306 |
| 2020/0159638 A1* | 5/2020 | Gupta | H04L 63/1408 |
| 2022/0066767 A1* | 3/2022 | Kumar | G06F 8/65 |
| 2022/0382655 A1* | 12/2022 | Patodia | G06Q 30/0241 |

\* cited by examiner

AUTOMATICALLY MANAGED COMMON ASSET VALIDATION FRAMEWORK FOR PLATFORM-BASED MICROSERVICES

TECHNICAL FIELD

The present application generally relates to coordinating and sharing assets between microservices and/or decision services, and more particularly to processing decision service requests and asset usages using machine learning (ML) and other artificial intelligence (AI) models to identify shared assets and unify computing code.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. When providing these computing services, the service provider may utilize decision services, which may correspond to micro-computing services having rules-based and/or machine learning-based engines, computing nodes, execution paths, and the like to process data requests and loads for different outputs (e.g., authentication, risk or fraud analysis, electronic transaction processing, etc.). In this regard, multiple microservices and other decision services depend on each other and operate together in a computing architecture. There may be also data and other computing code and/or assets shared between the services, which may lead to duplication of assets. This may create inefficiencies both in the computing system and for developers and other code writers. For example, if a decision service utilizes the same or similar code to provide a computing task for the same or similar data load, it would be inefficient to prepare, execute, and/or store assets that perform the same or similar operations that may be shared between such services. Thus, the service provide may desire computing operations to test assets and changes made to the assets on a common platform against all the dependent services for commonality, such as followed by a new platform release.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for an automatically managed common asset validation framework for platform-based microservices. Systems suitable for practicing methods of the present disclosure are also provided.

A user may utilize online service providers, such as transaction processors, via their available online and networked platforms. For example, a user may make a payment to another user or otherwise transfer funds using the online platforms of the service providers. In this regard, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more transactions with a recipient, such as a recipient account or digital wallet that may receive an amount of a payment. When engaging in these interactions, the service provider may provide decision services that may be used to process data requests and data loads and provide a decision or other output, which may be used in conjunction to provide computing services to users. In some environments and/or conditions, multiple decision services may utilize the same data load, such as an account balance, account login name, contact identifier, user input for the data request, profile or transaction history, or the like. A computing architecture may function to analyze requests for decisions service using machine learning (ML), neural network (NN), and other artificial intelligence (AI) engines in order to determine whether common computing assets may be updated between multiple decision services.

For example, a service provider may provide different computing resources and services to users through different websites, resident applications (e.g., which may reside locally on a computing device), and/or other online platforms. When utilizing the services of a particular service provider, the service provider may provide decision services for implementing rules and intelligent (e.g., ML or other AI-based) decision-making operations with such services. For example, an online transaction processor may provide services associated with electronic transaction processing, including account services, user authentication and verification, digital payments, risk analysis and compliance, and the like. These decision services may be used to determine if, when, and how a particular service may be provided to users. For example, risk rules may be utilized with a risk engine for a decision service to determine if an indication of fraud is present in a digital transaction and payment, and therefore to determine whether to proceed with processing the transaction or decline the transaction (as well as additional operations, such as request further authentication and/or information for better risk analysis). Thus, decision services automate repeatable decisions based on decision modeling capabilities so that computing services may execute and perform operations requested by a user's computing device.

In this regard, a decision service may include different data processing nodes or services (e.g., sub-services that are invoked by the main decision service), where each data processing node may include executable instructions to perform one or more computing tasks that process data from a data processing request and output a response. For example, computing tasks may correspond to executable code, operations, and/or models that may include a client device request processor, a compute for business rules, a data loader, a validation of a data load of the data processing request, a user authenticator, or a response builder for a decision by the decision service, although other tasks may also be used. In this regard, a decision service may include computing tasks that obtain an intended result based on a provided data load for a data processing request.

These computing tasks may be executed in an order and/or processing flow according to a directed acyclic graph (DAG) or another directed graph or ordering of the computing tasks for execution by the decision service. For example, a DAG or other graph may correspond to a flow between computing tasks that causes output of a decision. Computing tasks may be arranged in an order within a DAG depending on the decision service and/or data processing request, for example, so that certain computing tasks may execute and provide data for processing by later computing tasks. A data processing request may be a request from a client computing device, such as an end user or customer of the service provider system, which may request use of a computing service and provide a data load for processing. For example, a data processing request may be associated with a particular request for use of a service for account login, authentication, electronic transaction processing, risk or fraud, and other ones of the aforementioned computing services. The directed graph may therefore correspond to the execution flow and show the different execution paths for executing the computing tasks in series, parallel, or the like. This may include having nodes for computing tasks connected by edges to show the various paths (e.g., in series, parallel, start, end, etc.) for the execution flow of the decision service.

Testing a computing platform with the latest changes for all dependent services may not be practical or possible because of multiple team involvements for such decision services and platforms that may be required (e.g., for creating a test build with latest platform snapshot and/or computing code/build, setting up of a test environment, deployment, test execution and sharing of the report, etc.). Additionally, availability, priority and geographical location of different teams, computing resources, and/or computing centers that may add to the complexity of code changes. The changes made to a common or shared platform may also be frequent with new common platform versions released in quick succession, such as two or three times a week, making testing the changes difficult. In this regard, the operations may be performed by identifying and unifying requests between dependent decision services for use in test cases.

A test service may be created using the latest version of a common platform and may process the unified requests. When a change is performed to common assets before releasing to the common platform, a framework may be used to execute and run all the dependent services for the unified request against this test service in order to detect any spill over issues and causations by changes to computing code and updates based on the unified request(s). The generated unified request may contain common platform data from an execution context serialized into JSON or other data format. For service onboarding, there may be an addition of a unified request generator as a dependency for the framework (e.g., a Unified Request Generator that has access to the test service details, configurations, URLs, etc.). Once the functional tests for any of the service runs, the unified request generator may access the execution context (e.g., common assets' data) and remove the unnecessary fields. This may further include adjusting and changing that data to create a unified request. The generated unified requests may then be placed inside the decision services by the unified request generator.

For example, a change may be made to a common asset, such as a shared piece of code, ML model, rules engine, or the like. For example, an account balance field and/or data record(s) (e.g., one or more data rows and/or tables) may be an asset that is commonly shared between decision services and considered a common platform asset utilized by multiple decision services. There may be an option to determine whether an account balance is negative or not (e.g., an account balance has defaulted or is overdrawn or not). If a first decision service may make a change and/or want to have values for the field in a database, table, or record for the field to be recorded and/or stored as 0 and 1 for true and false, the first decision service would need to modify the field, code for data recording, database storage parameters, and/or the like. The first service may modify the common asset and a new common platform version of the field would be deployed as a change to the common asset.

Thus, a change may be made in one of the common assets by a decision service, and a snapshot version of the common platform may be generated. Once the change is deployed, the test service and/or common platform may test the change against all decision services utilizing the common asset. The test service may then process the generated snapshot version for changes made and/or changes needed to be proliferated across different decision services utilizing the common or shared asset. Services consuming the common assets are therefore identified. A unified request may be generated and utilized to test the change against all services. All the identified services' unified requests specific to the changed common asset are then run against the test service. After the unified requests are run against the test service, results of the test may be validated. Any validated and/or failed results may then be detected.

In the event that any issues are identified with dependent services tests, the decision service changing the common asset is notified of the issues and its change is not merged to the common platform and/or updated. In case of successful sharing and updating of the common asset, the new common platform version may be released with the changes. Thus, when the common asset change is made by a service and the functional test is run to validate the changes, the unified request generator generates a new unified request containing the changes and replace the old requests. An action may be taken on based on issues identified, which may include training or retraining an ML or other AI model to identify and perform such changes across other platforms and/or decision services. The recommendation module for such an ML or other AI model may be based on the model data, which may make changes in the impacted services and notify the owners of the decision service and change. This may allow for early detection of possible issues, additional time to address and/or fix such issues, automatic deployment of changes in different decision services and common shared assets, and less computing load on testing computing and network resources and operations.

Figure 1:
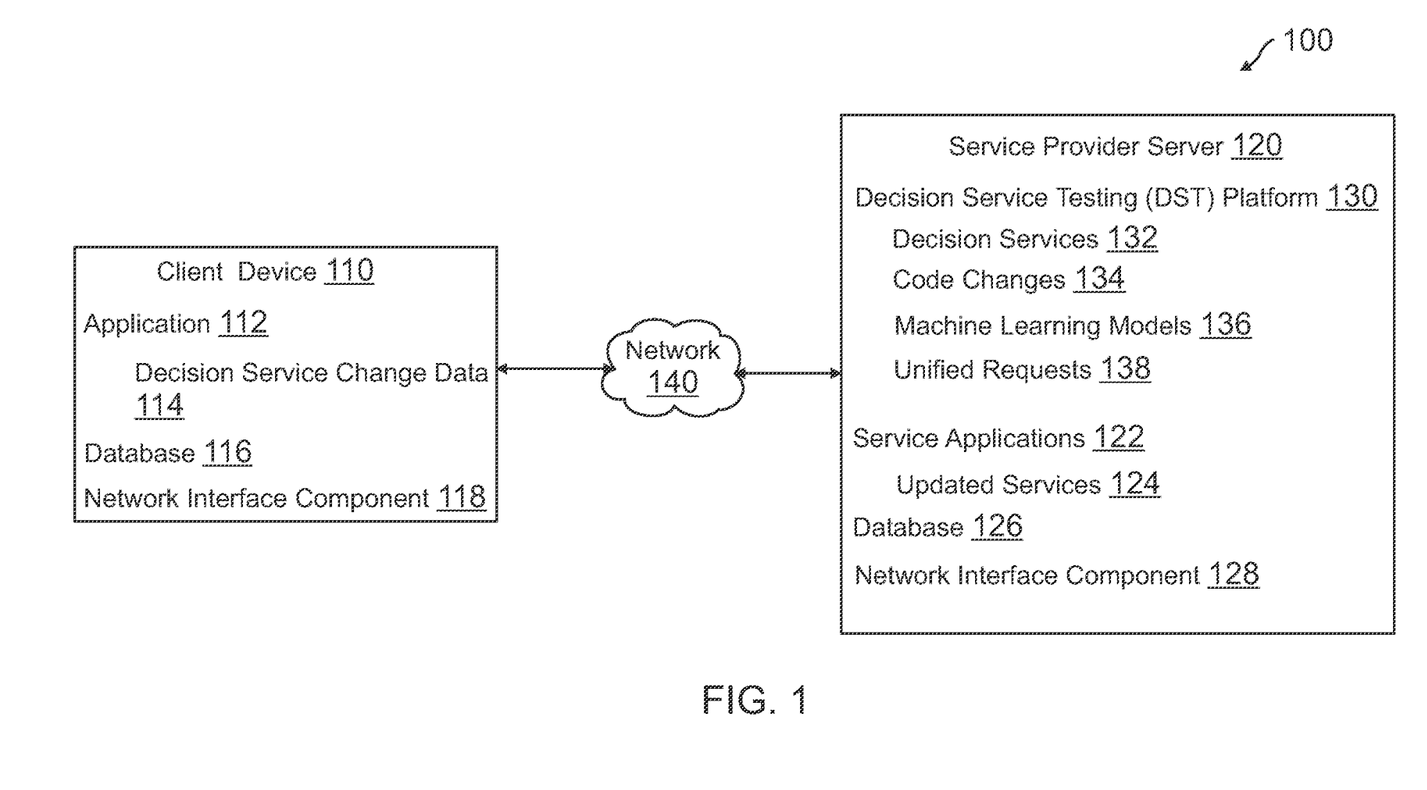
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user to access a computing service or resource provided by service provider server 120, where service provider server 120 may provide various data, operations, and other functions to client device 110 via network 140. These computing services may utilize decision services for decision-making during data processing. In this regard, client device 110 may be used to access a website, application, or other platform that provides computing services. Service provider server 120 may provide computing services that process data and provide decisions in response to data processing requests via decision services, where the decision services may be implemented to provide automatically managed common assets and validation of such assets among different platforms.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS® and/or other headsets including metaverse configured headsets), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and utilizing computing services provided by service provider server 120. In this regard, application 112 may correspond to specialized software utilized by a user of client device 110 that may be used to access a website or application (e.g., mobile application, rich Internet application, or resident software application) that may display one or more user interfaces that allow for interaction with the computing services of service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider server 120 or other entity.

Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may also correspond to different service applications and the like. When utilizing application 112 with service provider server 120, application 112 may provide and/or request processing of a decision service change data 114. Decision service change data 114 may correspond to account login, authentication, electronic transaction processing, and/or use of other services described herein, which may affect an asset that is commonly processed between different decision services. Decision service change data 114 may have a corresponding data load that is processed via one or more decision services of service provider server 120 for a corresponding data asset, as well as code changes and the like that may affect the data asset. As such, application 112 may be used with the decision services of service provider server 120, which may provide processing of unified requests to adjust, change, and/or revise shared assets between decision services.

In various embodiments, client device 110 includes other applications as may be desired in particular embodiments to provide features to client device 110. For example, the other applications may include security applications for implementing client-side security features, programmatic client applications for interfacing with appropriate application programming interfaces (APIs) over network 140, or other types of applications. The other applications may also include email, texting, voice and IM applications that allow a user to send and receive emails, calls, texts, and other notifications through network 140. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for client device 110. The other applications may include device interface applications and other display modules that may receive input from the user and/or output information to the user. For example, the other applications may contain software programs, executable by a processor, including a graphical user interface (GUI) configured to provide an interface to the user. The other applications may therefore use devices of client device 110, such as display devices capable of displaying information to users and other output devices, including speakers.

Client device 110 may further include database 116 stored on a transitory and/or non-transitory memory of client device 110, which may store various applications, machine or computer readable code or instructions, and data and be utilized during execution of various modules of client device 110. Database 116 may include, for example, identifiers such as operating system registry entries, cookies associated with application 112 and/or the other applications, identifiers associated with hardware of client device 110, or other appropriate identifiers, such as identifiers used for payment/user/device authentication or identification, which may be communicated as identifying the user/client device 110 to service provider server 120. Moreover, database 116 may include data used for decision service change data 114, such as data that may be provided as a data load processed by service provider server 120.

Client device 110 includes at least one network interface component 118 adapted to communicate with service provider server 120 and/or other devices and servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize decision services for decision-making in an intelligent system to provide responses, output, and/or results to client device 110 based on data processing requests. In this regard, service provider server 120 includes one or more processing applications which may be configured to interact with client device 110. For example, service provider server 120 may deploy decision services that include intelligent decision services that may automatically manage common asset changes between different decision services. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a decision service testing (DST) platform 130, service applications 122, a database 126, and a network interface component 128. DST platform 130 may correspond to executable processes, procedures, and/or applications with associated hardware. In other embodiments, service provider server 120 may include additional or different modules having specialized hardware and/or software as required.

DST platform 130 may correspond to one or more processes to execute modules and associated specialized hardware of service provider server 120 to update, test, and/or provide computing services for account usage, digital electronic communications, electronic transaction processing, and the like via decision services. In this regard, DST platform 130 may correspond to specialized hardware and/or software used by a user associated with client device 110 to utilize one or more computing services through service applications 122, which in turn utilize decision services 132 corresponding to computing microservices for decision-making during runtime. Service applications 122 may include a transaction processing application corresponding to electronic transaction processing, payment accounts, payment messaging, and the like. Further, service applications may include social networking, media posting or sharing, microblogging, data browsing and searching, online shopping, and other services available through service provider server 120. Service applications 122 of DST platform 130 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for access and use of the computing services of DST platform 130.

The computing services may be accessed and/or used through a browser application and/or dedicated payment application executed by client device 110, such as application 112 that displays UIs from service provider server 120. Such account services, account setup, authentication, electronic transaction processing, and other computing services of service applications 122 for DST platform 130 may utilize decision services 132, such as for authentication, electronic transaction processing, risk analysis, fraud detection, and the other decision-making and data processing required by the aforementioned computing services. Decision services 132 may correspond to main decision services used for decision-making using rules-based and/or AI models and engines.

However, various computing tasks of decision services 132 may require updating of common assets used between different services and/or computing services, such as database tables, code updates to executable code, and the like. Service applications 122 of DST platform 130 may therefore include one or more data processing nodes and/or tasks that require code updates and store or share such updates. This may include code changes 134 performed by one or more users, coders, data scientists, administrators, or the like. With code changes 134, one or more shared data assets may be affected, which may be used by multiple ones of decision services 132. This may include shared data tables, code executable by rules-based and/or ML-based engines, and the like. For example, code changes 134 may be implemented to provide an update or change to such engines utilized by decision services 132. In order to provide for changes to common assets based on code changes 134, DST platform 130 may utilize unified requests 138 to share and/or unify such changes that are usable across multiple ones of decision services 132.

DST platform 130 may utilize machine learning (ML) models 136 in order to generate unified requests 138 to affect code changes 134 across various shared assets and/or platforms used by decision services 132. ML models 136 may include AI models, such as ML or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models 136, training data may be used to generate one or more classifiers and provide recommendations, predictions, or other outputs based on those classifications and an ML model. The training data may be used to determine input features for training predictive scores and/or outputs associated with affecting a change to a common asset based on one or more of code changes 134. For example, ML models 136 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models 136.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models 136 that attempt to classify whether a computing task should be re-run one or more additional times during decision service use. Thus, when ML models 136 are used to perform a predictive analysis and output, the input may provide a corresponding output based on the classifications trained for ML models 136.

ML models 136 may be trained by using training data associated, as well as the aforementioned features for decision services 132, corresponding computing tasks, metadata, and/or code changes 134 required to be affected over decision services 132. By providing training data to train ML models 136, the nodes in the hidden layer may be trained (adjusted) such that an optimal output (e.g., a classification) is produced in the output layer based on the training data. By continuously providing different sets of training data and penalizing ML models 136 when the output of ML models 136 is incorrect, ML models 136 (and specifically, the representations of the nodes in the hidden layer) may be trained (adjusted) to improve its performance in data classification. Adjusting ML models 136 may include adjusting the weights associated with each node in the hidden layer. Thus, the training data may be used as input/output data sets that allow for ML models 136 to make classifications based on input attributes. The output classifications for one or more of ML models 136 may be classifications of likelihood and/or possibility of unified requests 138 to be applied and/or recommendations on unified requests 138.

Service applications 122 may correspond to one or more processes to execute modules and associated specialized hardware of service provider server 120 to process a transaction or provide another service to customers, merchants, and/or other end users and entities of service provider server 120. In this regard, service applications 122 may correspond to specialized hardware and/or software used by service provider server 120 to providing computing services to users, which may include electronic transaction processing and/or other computing services using accounts provided by service provider server 120. In some embodiments, service applications 122 may be used by users associated with client devices 110 to establish user and/or payment accounts, as well as digital wallets, which may be used to process transactions. In various embodiments, financial information may be stored with the accounts, such as account/card numbers and information that may enable payments, transfers, withdrawals, and/or deposits of funds. Digital tokens for the accounts/wallets may be used to send and process payments, for example, through one or more interfaces provided by service provider server 120. The digital accounts may be accessed and/or used through one or more instances of a web browser application and/or dedicated software application executed by client devices 110 and engage in computing services provided by service applications 122. Computing services of service applications 122 may also or instead correspond to messaging, social networking, media posting or sharing, microblogging, data browsing and searching, online shopping, and other services available through service provider server 120. Service applications 122 may utilize updated services 124 based on unified requests 138 from DST platform 130.

In various embodiments, service applications 122 may be desired in particular embodiments to provide features to service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including a graphical user interface (GUI), configured to provide an interface to the user when accessing service provider server 120 via one or more of client devices 110, where the user or other users may interact with the GUI to view and communicate information more easily. In various embodiments, service applications 122 may include additional connection and/or communication applications, which may be utilized to communicate information to over network 140.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store financial information and tokenization data. Database 126 may further store data necessary for code changes 134 and unified requests 138 based on determinations by ML models 136, such as machine or computer executable code or instructions that when executed, cause service provider server 120 to perform various operations or steps, as discussed herein.

In various embodiments, service provider server 120 includes at least one network interface component 128 adapted to communicate client device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
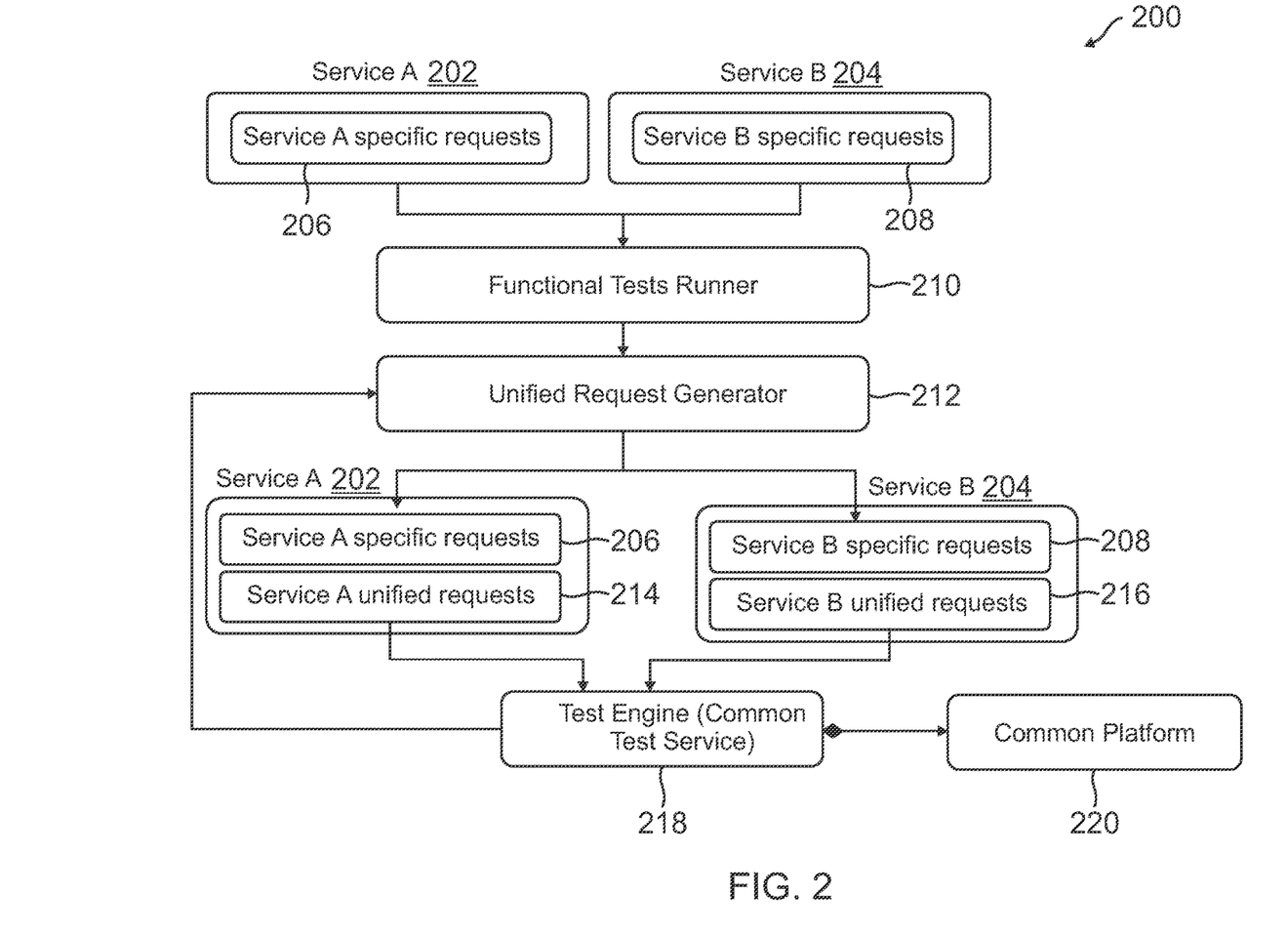
FIG. 2 is an exemplary system environment where a unified request generator may unify requests between different decision services for determination of common asset changes, according to an embodiment.

FIG. 2 is an exemplary system environment 200 where a unified request generator may unify requests between different decision services for determination of common asset changes, according to an embodiment. System environment 200 of FIG. 2 includes a service A 202 and a service B 204 for an intelligent execution system and/or decision service engine provided by service provider server 120, such as those of decision services 132 discussed in reference to system 100 of FIG. 1. In this regard, a client device, such as client device 110 discussed in reference to system 100, may provide changes and/or updates to service A 202 and/or service B 204, which may be unified in a corresponding manner for service A requests 206 and service B requests 208 via a functional tests runner 210 and a unifier request generator 212.

In system environment 200, the client device initially requests data processing, such as by providing one or more data loads via a computing service that requires action from a service provider for updating service A 202 and/or service B 204. This may be uploaded and provided to functional tests runner 210 for deployment via service A requests 206 and/or service B requests 208. To avoid duplication of the assets common to multiple services, assets affected by this change and/or data load may be moved to a common platform layer and released as independent artifacts which are then consumed by the services. There may be multiple services and/or users of such common or shared assets, and thus any service may make modifications in the common asset which may affect other services. This may create a spill-over effect with changes to service A 202 and/or service B 204, or other decision services.

When a service requires a change in the common asset, functional tests runner may be invoked to test the change, such as to code, data, or the like, and push the change out to production. At a later time, when a different service consuming the same asset upgrades to the latest version, it may impact the decision service in different ways if the last change that was done by other dependent service is not backward compatible to the service's use case. The same is true for all services that are dependent on the platform for common assets. This can create an impact for multiple parties, entities, and/or computing resources and platforms, such as those involved with the initial change to the common asset, the entities responsible for managing the common platform, and/or the services that depend on the common asset. However, conventionally tests would require independent tests of the change to the common or shared asset across all dependent services that share and/or utilize the shared asset during setup and deployment.

Functional tests runner 210 may interact with unified request generator 212 in order to generate one or more unified requests for service A 202, service B 204, and/or other decision services that utilize the common or shared asset across a common computing platform. In this regard, unified request generator 212 may take a snapshot and create a latest version of a common platform 220 that unifies the decision services and their common or shared asset changes using a test engine 218 with one or more ML models. Unified request generator 212 may, before changes are done to a shared asset on common platform 220, test engine 218 may be used to run all the dependent services for the changes to the shared asset to determine whether the change may be performed and/or context serialized, such as in JavaScript Object Notation (JSON) format.

For example, with unified request generator 212, one of service A requests 206 may request a change that may affect a common asset shared with service B 204. This may be a code change or the like, which may be identified using common platform 220 based on the shared assets or other data. When a change is to be made, unified request generator 212 may execute one or more ML models to identify the shared asset and the sharing between service A 202 and service B 204 based on service A requests 206 and/or service B requests 208. Thereafter, one or more ML models may further be used with test engine 218 in order to generate a unified request, which formats and/or adjusts the change to be compatible for the shared asset with service A 202 and service B 204, such as with service A unified requests 214 and/or service B unified requests 216. This may be done to validate new changes and ensure those changes do not affect dependent services. For example, a change to a common asset code to make the newly added field as optional thereby making the common asset usable for all the services. This may include adding or removing data fields, code, or the like. An example of a change to a common asset that is processed by unified request generator is described below with regard to the following paragraphs and table of the description of FIG. 2.

Service A 202 and service B 204 may utilize a single common asset, such as account information including account details (e.g., a balance, identifier, etc.), which may be loaded by making a call to a downstream service for data. The mandatory parameters for loading the account details or information may correspond to an account number, which is required to make the call to the downstream service. In this example, service A 202 may require additional information from the downstream service, which may require the need to pass another parameter, such as "is the account active?" (isAccountActive) parameter. Thus, the owner or developer of service A 202 may adjust the common asset account to accept two or more parameters when a call is made for loading of account details. This may be tested using functional tests runner 210.

Figure 3:
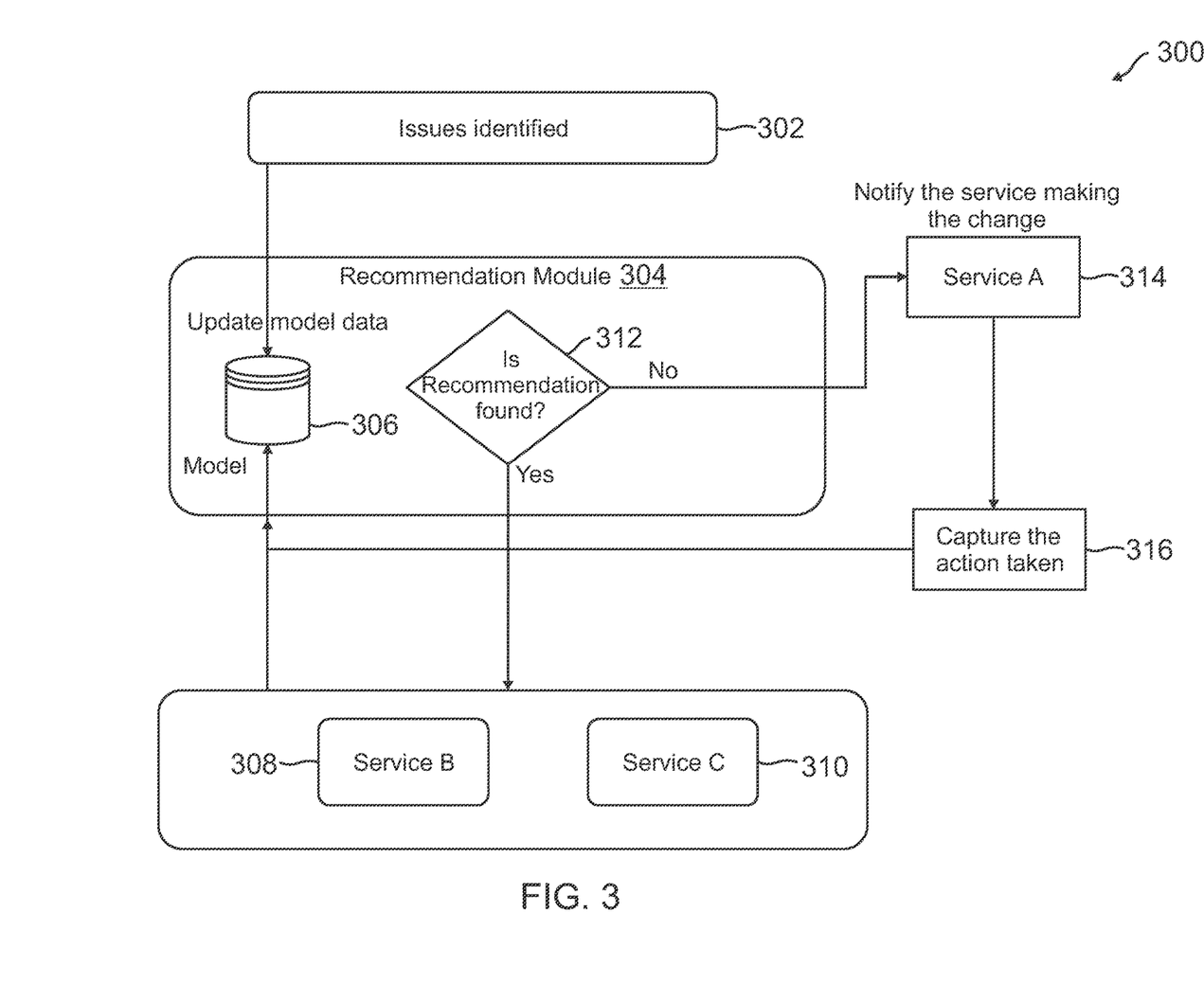
FIG. 3 is an exemplary diagram of operations for an automatically managed common asset validation framework for platform-based microservices, according to various embodiments.

Since the common asset has been changed, other services that utilize the common asset may be identified. Unified Request Generator 212 may be used to generate service A unified requests 214 and/or service B unified requests 216, which may be used by test engine 218 to test the change to the common asset and the effect and/or deployment of the change to the common asset on common platform 220. If the change fails with service B 204, changes to the common asset, a trained ML model and/or engine, and/or a recommendation module may adjust the change and/or decision services and notify service owners or developers of the change. For example, a change to a common asset code may be recommended to make the newly added field as optional or to implement with service B 204. Code of decision services may also be recommended and/or changes to operations of the decision services may be suggested. Further, a suggestion may be made to pass a default or null value in place of the new field and/or change. An exemplary table demonstrating module 304 to make changes to impacted services and/or notify the owners, administrators, coders, and/or other users that manage or are associated with the corresponding decision services. For example, the snapshot action may be used to capture the state of the computing platform to determine the decision services (e.g., decision service A 314, decision service B 308, and/or decision service C 310) that utilize the common or shared asset and thereafter determine, at action 312, whether there is a recommendation or unified request for the change to the common asset. The unified request may be based on and/or determined using a ML engine that unifies the change to the shared asset to be compatible over multiple decision services and/or computing platforms.

Thereafter, at action 316, the action taken is captured, which may then be used to provide the action to the decision services and/or train or retrain an ML model. For example, the action taken may be used in notifications and/or other

TABLE 1

| Service | Field | Parameters | Actual Result | Result | Change by recommendation module |
|---|---|---|---|---|---|
| Service A 202 | getAccountDetails | account number, isAccountActive | Account details loaded |  | Make isAccountActive optional |
| Service B 204 | getAccountDetails | account number | Exception in obtaining Account details | X | Suggest Service B to pass default value for isAccountActive field. |

FIG. 3 is an exemplary diagram 300 of operations for an automatically managed common asset validation framework for platform-based microservices, according to various embodiments. Diagram 300 includes a flow executable by service provider server 120 for generating a unified request for an update or change to a common asset for a corresponding one or more of decision services 132 discussed in reference to system 100 of FIG. 1. Diagram 300 may correspond to an execution flow of service provider server 120 that dynamically and intelligently provides recommendations and/or unified requests for changes or updates to be made to common assets among decision services, such as to software code, a software library, an application programming interface (API), and/or the like.

In diagram 300, the execution flow having paths begins when issues are identified at action 302, which may correspond to or based on an initial input code, change, and/or request for an update to a common or shared asset. The execution flow may provide the issues to a recommendation module 304, such as based on a change to a service A 314 that is notified of making the change to the corresponding data asset, such as a data table, computing code, ML model asset or attribute, or the like. In order to make the change to service A 314, diagram 300 then moves to having the model data or the like updated in a database repository 306 corresponding to the changed or updated data for the common or shared asset. This may include executing and/or processing the requested update or change to the data in database repository 306 by recommendation module 304.

Thereafter, in diagram 300, recommendation module 304 may identify a service B 308 and a service C 310, and a snapshot of the platform corresponding to the different decision services may be captured during a snapshot action. The identified issues and the snapshot of the platform may be used to train one or more AI models, such as rules-based and/or ML-model based engines that allow recommendation data that may be provided to decision services, update decision services, and/or provide additional functionality. Further, at action 316, the ML model may be further adjusted and/or retrained based on acceptance or refusal of the change to the shared asset by different owners or coders of the decision services. For example, the change to the shared asset may make such asset incompatible with or more inefficient for usage with one or more decision services, and therefore be refused from usage, while others may be accepted for use. Based on the feedback, the ML model may be further trained.

Figure 4:
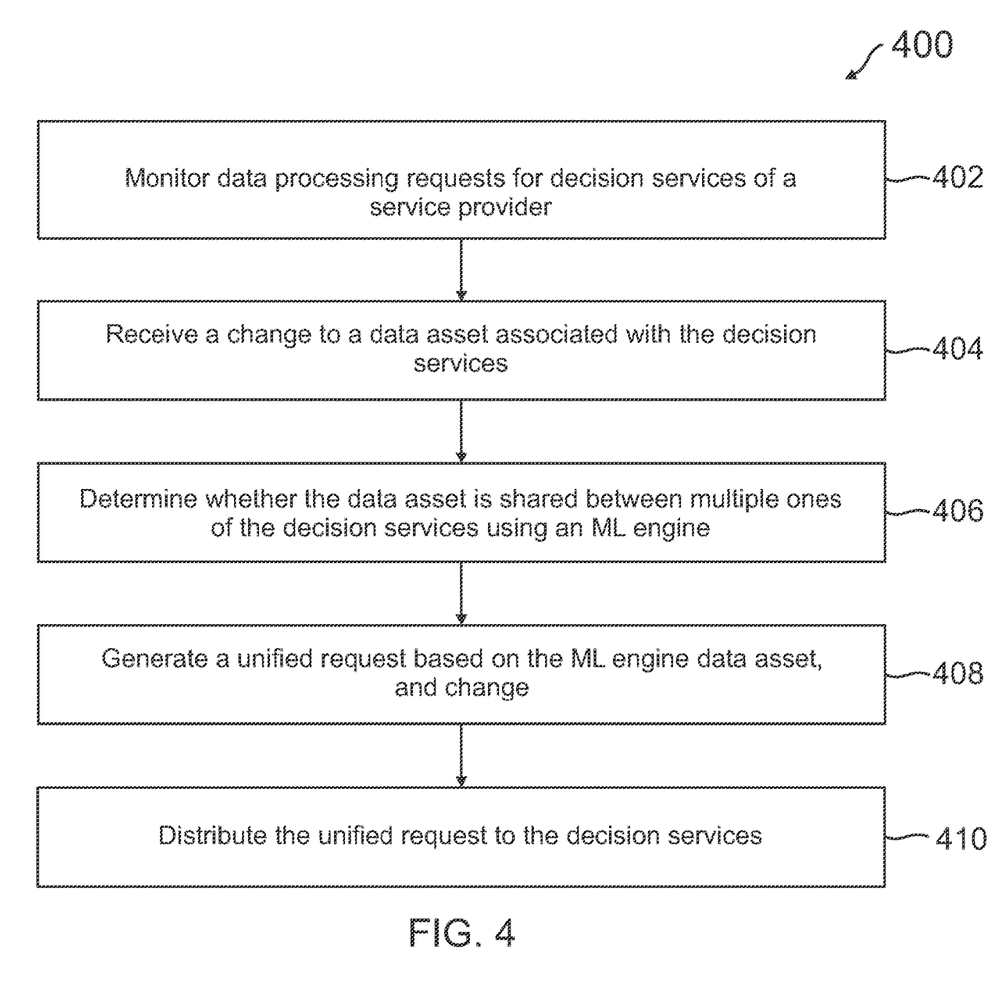
FIG. 4 is a flowchart of an exemplary process for an automatically managed common asset validation framework for platform-based microservices, according to an embodiment.

FIG. 4 is a flowchart 400 of an exemplary process for an automatically managed common asset validation framework for platform-based microservices, according to an embodiment. Note that one or more steps, processes, and methods described herein of flowchart 400 may be omitted, performed in a different sequence, or combined as desired or appropriate.

At step 402 of flowchart 400, data processing requests for decision services of a service provider are monitored. The data processing requests may be monitored and/or collected based on changes to computing tasks, node health and/or failures based on changes, uploaded requests for changes based on the data processing requests, causes of those changes, and other data that may be associated with the data processing requests for changes to common assets shared between different decision services of the service provider. The data processing requests may be uploaded and/or provided by one or more coders, users, administrators, or the like to a data repository and/or test service that tests and/or deploys the data processing requests that may be associated with one or more common assets shared between the decision services.

At step 404, a change to a data asset associated with the decision services is received. The change may be caused by one or more updates to data assets, such as to improve functionality, efficiency, prevent operational failures and/or bad data loads, and/or fix issues in network communication, among other required implemented changes to improve computing platform and/or data asset usage. The change may correspond to a change or formatting of one or more data tables or other data records. However, other changes may include those to computing code and the like that may be implemented with decision services, such as when using a test service to test and/or deploy computing code changes to different decision services and/or common assets utilized by those decision services. For example, a common asset may include attributes and/or other independent artifacts that are utilized by a common platform layer to be shared and consumed by multiple computing services.

At step 406, it is determined whether the data asset is shared between multiple ones of the decision services using an ML engine. When the change is made, a snapshot version of the common platform may be generated, which may be utilized by the test service when testing and/or deploying the change to the common or shared asset. This may also allow for identification of the decision services, microservices, and/or other computing services that utilize the common or shared asset. The snapshot of the common platform may be used to identify those sharing and/or utilizing the data asset, which may also be identified and/or classified using the ML engine.

At step 408, a unified request is generated based on the ML engine, data asset, and change. The unified request may be adjusted and/or changed by the ML engine in order to provide a more unified and/or recommended change to the common asset that is compatible across the decision services of the service provider. The unified request may include changes to data tables, computing code, or the like in order to unify the change across the decision services. The ML engine may then provide one or more proposed recommendations and/or changes that may be implemented and/or recommended across multiple decision services, computing platforms, code resources or repositories, and the like. At step 410, the unified request is distributed to the decision services, such as to update and/or implement one or more changes to the data asset that is shared based on the unified request. A recommendation module that is associated with the test service and/or unified request generator may also provide a notification, message, and/or implement a code or data change based on the unified request. This may be distributed to the decision services that utilize the shared asset.

Figure 5:
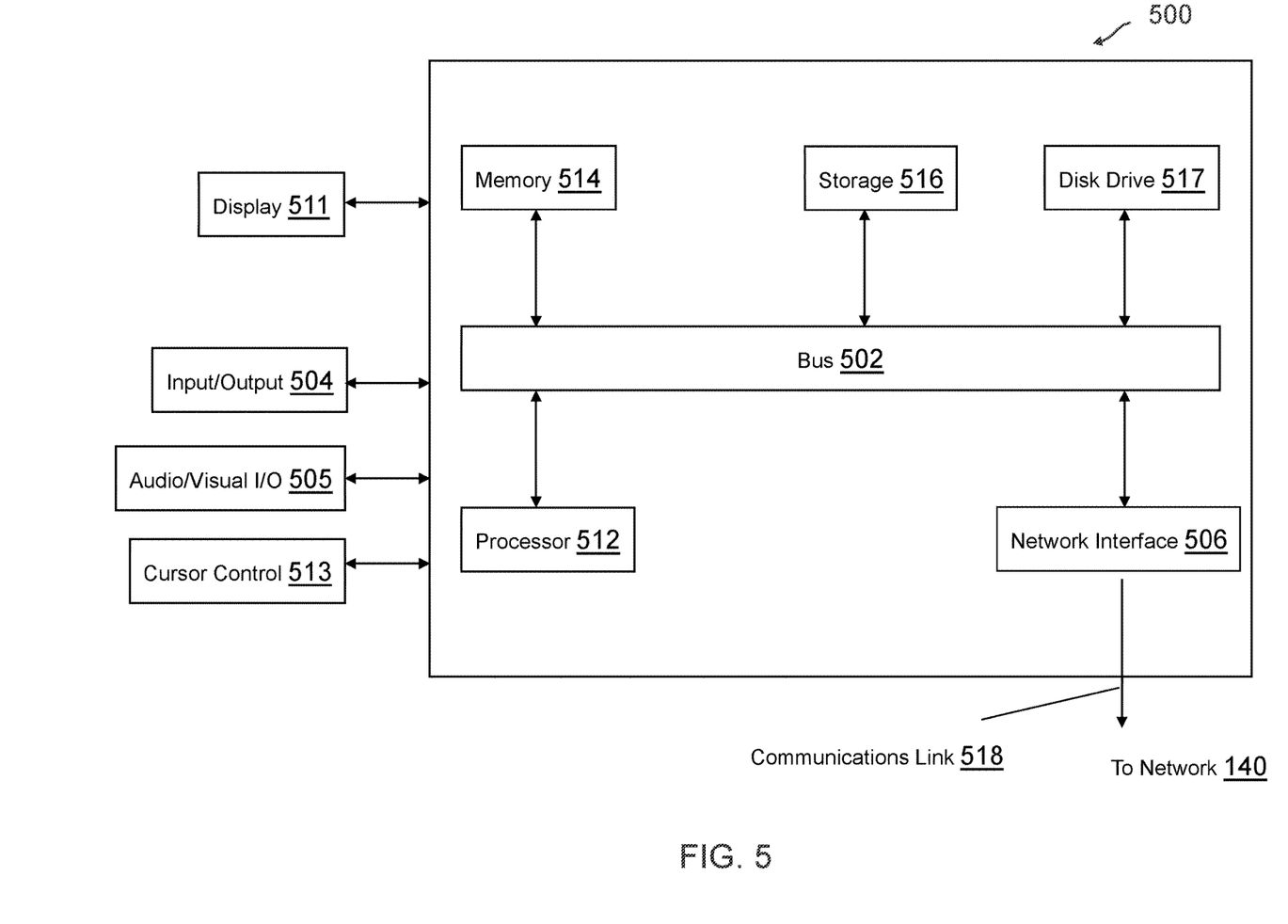
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
monitoring a plurality of data processing requests for a data asset of a plurality of decision services associated with an online service provider;
identifying a change to be made to the data asset with the plurality of decision services, wherein the change is designated to be proliferated across the plurality of decision services;
generating a unified request for the plurality of data processing requests based on the monitoring, wherein the unified request comprises the change to the data asset that is compatible with computing code for each of the plurality of decision services;
processing the plurality of data processing requests, the data asset, the change, and the plurality of decision services using a machine learning (ML) model trained for identification of corresponding changes to the computing code of each of the plurality of decision services; and
updating the data asset based on the change and the processing.

2. The system of claim 1, wherein the operations further comprise:
executing the plurality of decision services utilizing the updated data asset.

3. The system of claim 1, wherein the operations further comprise:
notifying data administrators associated with the plurality of decision services of the updating;
receiving a notification that one of the data administrators disallows the updated data asset with a corresponding one of the plurality of decision services; and
preventing a utilization of the updated data asset with the corresponding one of the plurality of decision services until an approval of the notification by the one of the data administrators.

4. The system of claim 3, wherein the operations further comprise:
notifying other ones of the data administrators of the notification and a highlighted version of the data asset indicating the change for the unified request.

5. The system of claim 1, wherein the data asset comprises one of a data table resource accessed by the plurality of decision services or a computing code resource utilized by the plurality of decision services.

6. The system of claim 1, wherein the ML model is implemented utilizing an intelligent compute system comprising at least one of a rules-based engine or an ML model-based engine.

7. The system of claim 1, wherein the operations further comprise:
accessing a directed graph for an execution flow of each of the plurality of decision services; and
identifying the data asset based on the directed graphs.

8. The system of claim 1, wherein the plurality of decision services comprises microservices associated with at least one of electronic transaction processing, risk analysis, fraud detection, or data authentication.

9. A method comprising:
receiving a change to be made to a data asset with decision services of a computing architecture, wherein the change is associated with a computing code of the data asset;
identifying at least a subset of the decision services utilizing the data asset;
generating a unified request for the change based on the at least the subset of the decision services;
processing the unified request using a machine learning (ML) model trained for identification of corresponding changes to each of the decision services based on the computing code; and
updating the data asset based on the processing, wherein the updating includes providing a notification of the updated data asset over the computing architecture to the at least the subset of the decision services.

10. The method of claim 9, further comprising:
receiving a rejection notification of the updated data asset from at least one of the subset of the decision services; and
reversing the updating of the data asset.

11. The method of claim 10, further comprising:
requesting approval of the updated data asset from other ones of the subset of decision services.

12. The method of claim 9, further comprising:
receiving a threshold number of acceptances of the updated data asset from the subset of decision services; and
implemented the updated data asset with the at least the subset of the decision services.

13. The method of claim 9, further comprising:
generating a data snapshot of the computing architecture having the decision services,
wherein the unified request is further generated based on the data snapshot.

14. The method of claim 13, wherein the data snapshot is based on computing services provided to users of the computing architecture, and wherein the ML model identifies the at least the subset of the decision services based on the data snapshot.

15. The method of claim 9, wherein the computing architecture comprises a recommendation module having at least the ML model that determines the changes to the data asset with the decision services.

16. A non-transitory machine-readable medium having stored thereon machine-readable instructions executable to cause a machine to perform operations comprising:
   identifying a set of decision services utilizing a data asset that is to be updated for a service provider system;
   generating a unified request for computing code that is to be changed with the set of decision services;
   processing the unified request using a machine learning (ML) model trained for computing code changes to each of the decision services;
   updating the data asset based on the processing; and
   generating and transmitting a notification of the updated data asset to one or more computing devices associated with the set of decision services.

17. The non-transitory machine-readable medium of claim 16, wherein the operations further comprise:
   receiving an agreement of the updating of the data asset by the data administrators; and
   implementing the updating based on the agreement.

18. The non-transitory machine-readable medium of claim 17, wherein the agreement requires a threshold number of the data administrators that approve the computing code for each of the decision services.

19. The non-transitory machine-readable medium of claim 16, wherein the ML model provides a set of coding changes to the computing code based on the unified request.

20. The non-transitory machine-readable medium of claim 16, wherein the data asset comprises a data record having one or more data value columns for unification across the decision services based on unified request.

* * * * *